(12) United States Patent
Bowers et al.

(10) Patent No.: US 8,854,715 B2
(45) Date of Patent: Oct. 7, 2014

(54) MAGNETIC CONTROL OF SURFACE STATES

(75) Inventors: Jeffrey A. Bowers, Kirkland, WA (US);
Peter L. Hagelstein, Carlisle, MA (US);
Roderick A. Hyde, Redmond, WA (US);
Muriel Y. Ishikawa, Livermore, CA (US); Jordin T. Kare, Seattle, WA (US);
Clarence T. Tegreene, Bellevue, WA (US); Lowell L. Wood, Jr., Bellevue, WA (US); Victoria Y. H. Wood, Livermore, CA (US)

(73) Assignee: The Invention Science Fund I LLC

( * ) Notice: Subject to any disclaimer, the term of this patent is extended or adjusted under 35 U.S.C. 154(b) by 204 days.

(21) Appl. No.: 13/619,651

(22) Filed: Sep. 14, 2012

(65) Prior Publication Data

US 2013/0016421 A1 Jan. 17, 2013

Related U.S. Application Data

(63) Continuation of application No. 12/316,265, filed on Dec. 9, 2008, now Pat. No. 7,751,112, and a continuation of application No. 12/799,051, filed on Apr. 16, 2010, now Pat. No. 8,274,731.

(51) Int. Cl.
*G02F 1/09* (2006.01)
*G02B 6/122* (2006.01)
*B82Y 20/00* (2011.01)
*G02B 6/12* (2006.01)

(52) U.S. Cl.
CPC ...... *G02B 6/1226* (2013.01); *G02B 2006/1213* (2013.01); *B82Y 20/00* (2013.01)
USPC .......................................... 359/280; 359/283

(58) Field of Classification Search
USPC ..................................... 359/280–283; 385/11
See application file for complete search history.

(56) References Cited

U.S. PATENT DOCUMENTS

| 5,332,911 | A | 7/1994 | von Klitzing et al. |
| 6,442,321 | B1 | 8/2002 | Berini |
| 6,614,960 | B2 | 9/2003 | Berini |
| 6,741,782 | B2 | 5/2004 | Berini |
| 6,801,691 | B2 | 10/2004 | Berini |
| 6,982,844 | B2 | 1/2006 | Rettner et al. |
| 6,987,484 | B2 | 1/2006 | von Klitzing et al. |
| 7,265,845 | B2 | 9/2007 | Kochergin |
| 7,372,648 | B2 | 5/2008 | Akiyama et al. |
| 2002/0131667 | A1 | 9/2002 | Berini |
| 2003/0059147 | A1 | 3/2003 | Berini |
| 2004/0008943 | A1 | 1/2004 | Berini |

(Continued)

FOREIGN PATENT DOCUMENTS

| GB | 2451336 A | 1/2009 |
| WO | WO 01/48521 A1 | 7/2001 |
| WO | WO 03/001258 A1 | 1/2003 |
| WO | WO 2007/109199 A2 | 9/2007 |

OTHER PUBLICATIONS

Bolle et al.; "Fundamental Considerations in Millimeter and Near-Millimeter Component Design Employing Magnetoplasmons"; IEEE Transactions on Microwave Theory and Technologies; Sep. 1981; pp. 916-923; vol. MIT-29; No. 9; IEEE.

(Continued)

*Primary Examiner* — William Choi

(57) ABSTRACT

A magnetic field may be applied to a plasmon path to affect plasmon propagation.

16 Claims, 17 Drawing Sheets

(56) References Cited

U.S. PATENT DOCUMENTS

| | | |
|---|---|---|
| 2004/0239936 A1 | 12/2004 | Kochergin |
| 2005/0073744 A1 | 4/2005 | Zheludev |
| 2005/0221128 A1 | 10/2005 | Kochergin |
| 2007/0292076 A1 | 12/2007 | Hyde et al. |
| 2008/0024784 A1 | 1/2008 | Hyde et al. |
| 2008/0193078 A1 | 8/2008 | Hyde et al. |
| 2010/0060977 A1 | 3/2010 | Karalis et al. |

OTHER PUBLICATIONS

Boltasseva, Alexandra; Nikolajsen, Thomas; Leosson, Kristjan; Kjaer, Kasper; Larsen, Morten S.; Bozhevolnyi, Sergey I.; "Integrated Optical Components Utilizing Long-Range Surface Plasmon Polaritons"; Journal of Lightwave Technology; Jan. 2005; pp. 413-422; vol. 23, No. 1; IEEE.

Chiu, K.W.; Quinn, J.J.; "Magnetoplasma Surface Waves in Metals*"; Physical Review B; Jun. 15, 1972; pp. 4707-4709;vol. 5; No. 12.

Fetter, Alexander L.; "Edge Magnetoplasmons in a Bounded Two-Dimensional Electron Fluid"; Physical Review B; Dec. 15, 1985; pp. 7676-7684; vol. 32; No. 12; The American Physical Society.

Fetter, Alexander L.; "Edge Magnetoplasmons in a Two-Dimensional Electron Fluid Confined to a Half-Plane"; Physical Review B; Mar. 15, 1986; pp. 3717-3723; vol. 33; No. 6; The American Physical Society.

Fink, Yoel; Winn, Joshua N.; Fan, Shanhui; Chen, Chiping; Michel, Jurgen; Joannopoulos, John D.; Thomas, Edwin L.; "A Dielectric Omnidirectional Reflector"; Science; Nov. 27, 1998; pp. 1679-1682; vol. 282.

Kik, Pieter G.; Martin, Andrea L.; Maier, Stefan A.; Atwater, Harry A.; "Metal Nanoparticle Arrays for Near Field Optical Lithography"; Proceedings of SPIE—Properties of Metal Nanostructures; bearing a date of 2002; pp. 7-13; vol. 4810; SPIE.

Kittel, Charles; "Introduction to Solid State Physics, 8th Edition"; Nov. 2004—1-page description printed on Dec. 1, 2008; pp. 1-704 (1 page description only provided); ISBN: 978-0-471-41526-8; located at http://www.wiley.com/WileyCDA/WileyTitie/productCd-047141526X,descCd-description.html?print=true ; John Wiley & Son, Inc.

Maier, Stefan A.; Barclay, Paul E.; Johnson, Thomas J.; Friedman, Michelle D.; Painter, Oskar; "Low-Loss Fiber Accessible Plasmon Waveguide for Planar Energy Guiding and Sensing"; Applied Physics Letters; May 17, 2004; pp. 3990-3992; vol. 84, No. 20; American Institute of Physics.

Peters et al.; "Observation of Audio-Frequency Edge Magnetoplasmons in the Classical Two-Dimensional Electron Gas"; Physical Review Letters; Oct. 14, 1991; pp. 2199-2202; vol. 67; No. 16; The American Physical Society.

Rahachou, A.I.; Zozoulenko, I.V.; "Waveguiding Properties of Surface States in Photonic Crystals"; Linkoping University, Department of Science and Technology, bearing dates of Oct. 31, 2005 and Feb. 9, 2008, pp. 1-4; located at http://www.itn.liu.se/meso-phot/publications/2005_waveguides_0510273.pdf.

Salerno, M.; Krenn, J.R.; Lamprecht, B.; Schider, G.; Ditlbacher, H.; Félidj, N.; Leitner, A.; Aussenegg, F.R.; "Plasmon Polaritons in Metal Nanostructures: The Optoelectronic Route to Nanotechnology"; Opto-Electronics Review; 2002; pp. 217-224; vol. 10, No. 3; COSiW SEP, Warsaw.

UK Intellectual Property Office Combined Search and Examination Report Under Sections 17 & 18(3); App. No. GB0921492.5; bearing a date of Apr. 8, 2010; pp. 1-4.

Yablonovitch, Eli; "Photonic Crystals: Semiconductors of Light"; Scientific American; Dec. 2001; pp. 47-55 (pp. 52-53 intentionally omitted—advertisements); Scientific American, Inc.

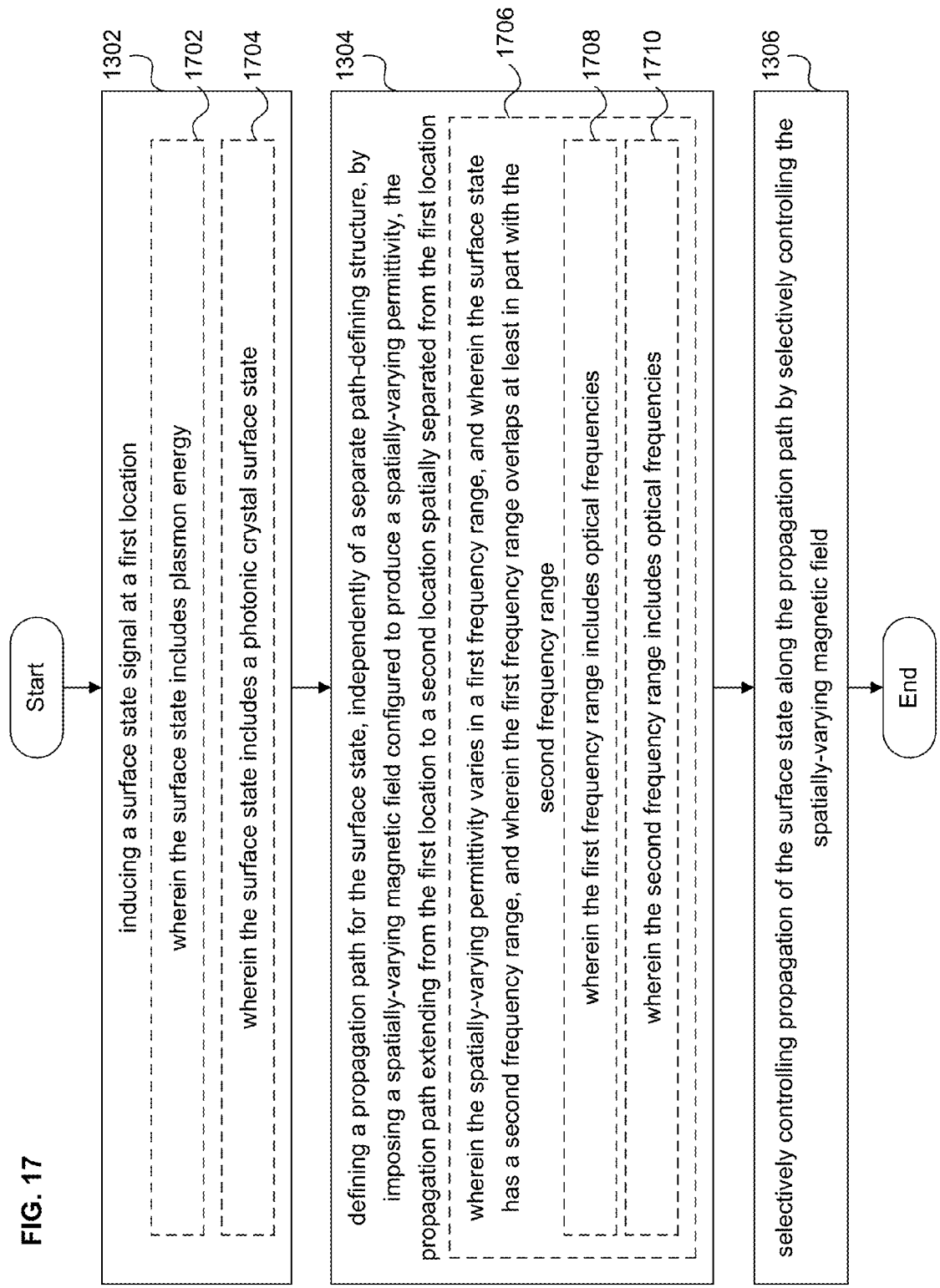

MAGNETIC CONTROL OF SURFACE STATES

CROSS-REFERENCE TO RELATED APPLICATIONS

The present application is related to and claims the benefit of the earliest available effective filing date(s) from the following listed application(s) (the "Related Applications") (e.g., claims earliest available priority dates for other than provisional patent applications or claims benefits under 35 USC §119(e) for provisional patent applications, for any and all parent, grandparent, great-grandparent, etc. applications of the Related Application(s)). All subject matter of the Related Applications and of any and all parent, grandparent, great-grandparent, etc. applications of the Related Applications, including any priority claims, is incorporated herein by reference to the extent such subject matter is not inconsistent herewith.

PRIORITY APPLICATIONS

For purposes of the USPTO extra-statutory requirements, the present application constitutes a continuation of U.S. patent application Ser. No. 12/316,265, entitled MAGNETIC CONTROL OF SURFACE STATES, naming Jeffrey A. Bowers, Peter L. Hagelstein, Roderick A. Hyde, Muriel Y. Ishikawa, Jordin T. Kare, Clarence T. Tegreene, Lowell L. Wood Jr., and Victoria Y. H. Wood as inventors, filed 9 Dec. 2008 now U.S. Pat. No. 7,751,112, which is currently co-pending or is an application of which a currently co-pending application is entitled to the benefit of the filing date.

For purposes of the USPTO extra-statutory requirements, the present application constitutes a continuation of U.S. patent application Ser. No. 12/799,051, entitled MAGNETIC CONTROL OF SURFACE STATES, naming Jeffrey A. Bowers, Peter L. Hagelstein, Roderick A. Hyde, Muriel Y. Ishikawa, Jordin T. Kare, Clarence T. Tegreene, Lowell L. Wood Jr., and Victoria Y. H. Wood as inventors, filed 16 Apr. 2010 which is currently co-pending or is an application of which a currently co-pending application is entitled to the benefit of the filing date.

The United States Patent Office (USPTO) has published a notice to the effect that the USPTO's computer programs require that patent applicants reference both a serial number and indicate whether an application is a continuation, continuation-in-part, or divisional of a parent application. Stephen G. Kunin, Benefit of Prior-Filed Application, USPTO Official Gazette Mar. 18, 2003. The present Applicant Entity (hereinafter "Applicant") has provided above a specific reference to the application(s) from which priority is being claimed as recited by statute. Applicant understands that the statute is unambiguous in its specific reference language and does not require either a serial number or any characterization, such as "continuation" or "continuation-in-part," for claiming priority to U.S. patent applications. Notwithstanding the foregoing, Applicant understands that the USPTO's computer programs have certain data entry requirements, and hence Applicant has provided designation(s) of a relationship between the present application and its parent application(s) as set forth above, but expressly points out that such designation(s) are not to be construed in any way as any type of commentary and/or admission as to whether or not the present application contains any new matter in addition to the matter of its parent application(s).

SUMMARY

In one embodiment, a method comprises: inducing a surface state signal at a first location; defining a propagation path for the surface state, independently of a separate path-defining structure, by imposing a spatially-varying magnetic field configured to produce a spatially-varying permittivity, the propagation path extending from the first location to a second location spatially separated from the first location; and selectively controlling propagation of the surface state along the propagation path by selectively controlling the spatially-varying magnetic field.

In another embodiment, an apparatus comprises: a first surface state support including an input location and an output location; and a first magnetically responsive structure interposed at a first central location intermediate the input location and the output location, the first magnetically responsive structure being responsive to a spatially-varying magnetic field to produce a spatially-varying permittivity proximate to the first surface state support to control surface state propagation independently of a separate path-defining structure.

In another embodiment, a system comprises: a first plasmon route defining region including a magnetically interactive portion responsive to a first magnetic field to define a propagation route of a first plasmon signal absent a separate routing structure.

In another embodiment, an apparatus comprises: a first surface state support including an input location and an output location, the first surface state support being defined by a boundary between a first material and a second material, wherein each of the first material and the second material is optically thick; and a first magnetically responsive structure interposed at a first central location intermediate the input location and the output location, the first magnetically responsive structure being responsive to a magnetic field to control surface state propagation by establishing a first permittivity proximate to the first surface state support.

In another embodiment, an apparatus comprises: a first photonic crystal surface state support including an input location and an output location, wherein the first photonic crystal surface state support includes an interface between a first photonic crystal and a second material; and a first magnetically responsive structure interposed at a first central location intermediate the input location and the output location, the first magnetically responsive structure being responsive to a magnetic field to control surface state propagation by establishing a first permittivity proximate to the first photonic crystal surface state support.

In another embodiment, a method comprises: inducing a surface state at a first input location; defining a propagation path for the surface state by imposing a spatially-varying magnetic field having a first non-zero distribution, wherein the first non-zero distribution has a first non-zero magnitude B1 at a first magnetic field location r1 on the propagation path and a second non-zero magnitude B2 at a second magnetic field location r2 on the propagation path, the first spatially-varying magnetic field being configured to produce a spatially-varying permittivity, the propagation path extending from the first input location to a first output location spatially separated from the first input location; and varying the propagation path by changing the first spatially-varying magnetic field to a second magnetic field having a second non-zero distribution, wherein the second non-zero distribution has a third non-zero magnitude B3 at the first magnetic field location r1 and a fourth non-zero magnitude B4 at the second magnetic field location r2, and wherein the ratio of B4/B3 is different from the ratio of B2/B1.

In another embodiment, an apparatus comprises: a first surface state support including an input location and at least two output locations; and at least one magnetically responsive structure interposed at least one first central location intermediate the input location and the at least two output locations, the at least one magnetically responsive structure being responsive to a magnetic field to block surface state propagation to at least one of the at least two output locations.

In another embodiment, a method comprises: coupling a first surface state mode in a first dielectric region to a second surface state mode in a second dielectric region, the first dielectric region and the second dielectric region being at least partially overlapping; and varying said coupling of the first surface state mode to the second surface state mode by applying a first magnetic field to at least one of the first region and the second region.

In another embodiment, a method comprises: varying the coupling between a surface state in a first dielectric region and a radiative mode by varying a magnetic field applied to the first dielectric region, the applied magnetic field being configured to vary the permittivity of at least a portion of the first dielectric region.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

FIGS. 14-17 depict variants of the flow chart of FIG. 13.

DETAILED DESCRIPTION

Figure 1:
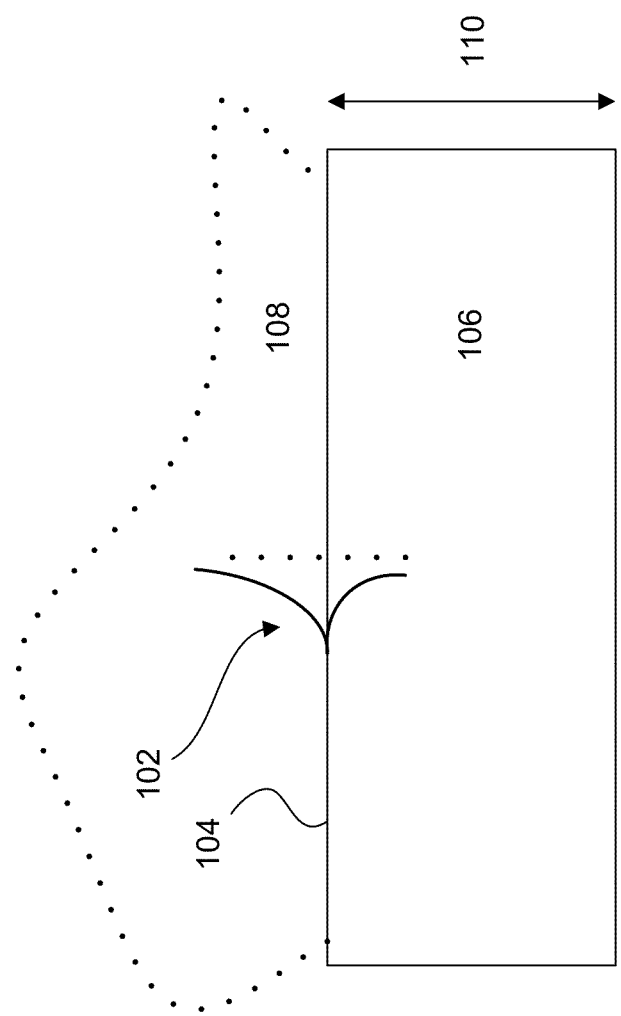
FIG. 1 shows a surface state at a boundary.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here.

Surface states may exist on a boundary between two materials when the real parts of their dielectric constants $\in$ and $\in'$ have different signs, for example between a metal and a dielectric. FIG. 1 shows a surface state 102 at a boundary 104 of a material 106 having a negative real dielectric constant, such as a metal. The material or structure 108 forming the boundary 104 with the material 106 may be: air, vacuum, or its equivalent; a substantially homogeneous dielectric material; or a different material or structure. The boundary 104, although shown as being substantially continuous and planar, may have a different shape. The surface state 102, although shown as including substantially exponential functions with a field maximum at the boundary 104, may include only approximately exponential functions, may be described by a different function, and/or may have a field maximum someplace other than the boundary. Further, although the surface state 102 is shown at a certain location on the boundary 104 for illustrative purposes, the spatial distribution of the surface state 102 may be anything. Surface states are described in C. Kittel, "INTRODUCTION TO SOLID STATE PHYSICS", Wiley, 2004, which is incorporated herein by reference.

In some embodiments the material thickness 110 may be smaller than the surface state wavelength, as described in Alexandra Boltasseva, Thomas Nikolajsen, Krisjan Leosson, Kasper Kjaer, Morten S. Larsen, and Sergey I. Bozhevolnyi, "INTEGRATED OPTICAL COMPONENTS UTILIZING LONG-RANGE SURFACE PLASMON POLARITONS", Journal of Lightwave Technology, January, 2005, Volume 23, Number 1, which is incorporated herein by reference. Further, Boltasseva describes how a metal may be embedded in a dielectric to allow propagation of long-range surface plasmon polaritons, where the parameters of the metal [including thickness 110 and width (not shown)] may control the propagation of the plasmon.

Figure 2:
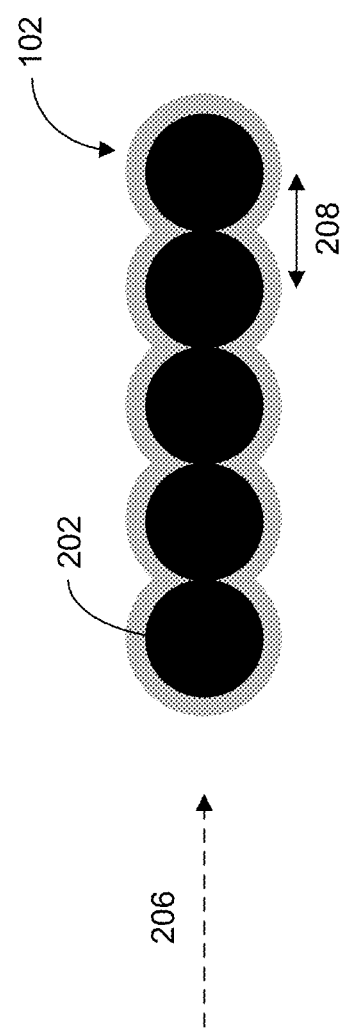
FIG. 2 shows an array of particles.

Particles 202 may be configured to support and guide surface states, where the particles 202 shown in FIG. 2 are silver spheres. Particles supporting surface states are described in M. Salerno, J. R. Krenn, B. Lamprecht, G. Schider, H. Ditlbacher, N. Félidj, A. Leitner, and F. R. Aussenegg, "PLASMON POLARITONS IN METAL NANOSTRUCTURES: THE OPTOELECTRONIC ROUTE TO NANOTECHNOLOGY", Opto-Electronics Review, 2002, Volume 10, Number 3, pages 217-222, which is incorporated herein by reference. Creation of surface states on a particle in an electromagnetic field is described in P. G. Kik, A. L. Martin, S. A. Maier, and H. A. Atwater, "METAL NANOPARTICLE ARRAYS FOR NEAR FIELD OPTICAL LITHOGRAPHY", Proceedings of SPIE, 4810, 2002 which is incorporated herein by reference. FIG. 2 shows electromagnetic energy 206 incident on a chain of particles 202, where the electromagnetic energy 206 couples to surface states 102 on the particles 202. The surface states 102 are shown having a finite extent in FIG. 2 for clarity and one skilled in the art will recognize that the spatial distribution of the surface states 102 may fall off according to a power law away from the particles 202 and/or may have a different distribution than that shown in FIG. 2. Particles 202 may be configured on a substrate (not shown), as described in Stefan A. Maier, Paul E. Barclay, Thomas J. Johnson, Michelle D. Friedman, and Oskar Painter, "LOW-LOSS FIBER ACCESSIBLE PLASMON WAVEGUIDE FOR PLANAR ENERGY GUIDING AND SENSING", Applied Physics Letters, May 17, 2004, Volume 84, Number 20, Pages 3990-3992, which is incorporated herein by reference.

Although the particles 202 in FIG. 2 are shown as being substantially spherical, the particles may have a different shape that is configured to support surface states. Further, although the particles 202 are shown as being substantially the same size, the particles 202 may vary in size, by design or by a randomized process of manufacturing the particles 202. Moreover, the particles need not be homogenous or even solid. Also, although the particles 202 are described as silver particles, particles 202 that support surface states may comprise a different metal or a different material. Although the particles 202 are illustrated as having a spacing between particles 208 that is substantially constant, the spacing may vary and may be different from that shown in FIG. 2, and in some embodiments, the particles 202 may be touching or very nearly so.

A surface state may exist on a dielectric-dielectric interface where one of the dielectrics has a negative, or effectively negative, permittivity. For example, where one or both of the dielectrics is a material having a band gap, such as a photonic crystal, a surface state may exist at the interface between the photonic crystal and the other dielectric in the forbidden energy bands of the photonic crystal. Photonic crystals are described in E. Yablonovitch, "PHOTONIC CRYSTALS: SEMICONDUCTORS OF LIGHT", Scientific American, December 2001, Volume 285, Number 6, pages 47-55, which is incorporated herein by reference.

Figure 3:
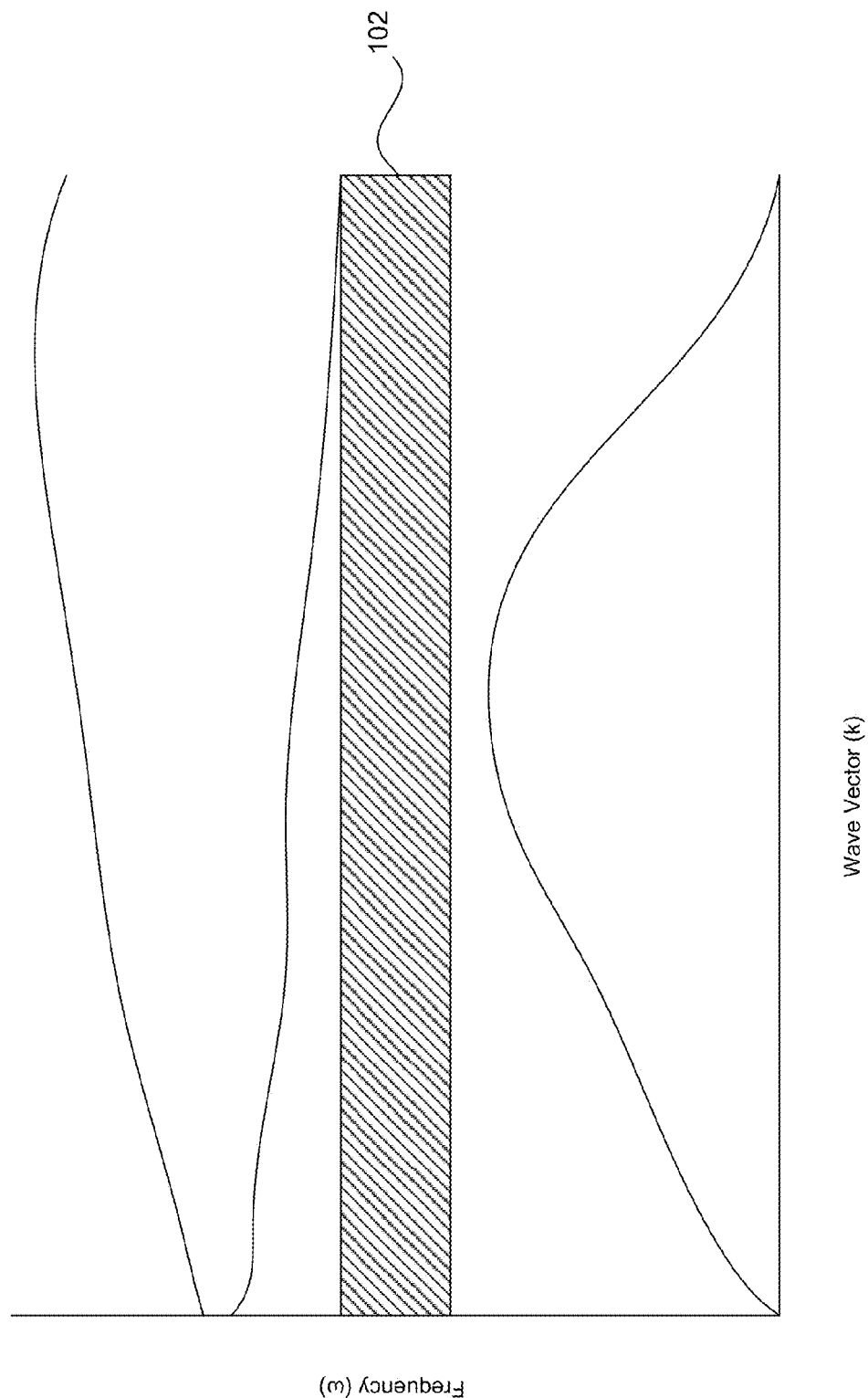
FIG. 3 shows a photonic band gap diagram.

A band gap diagram with band gap 302 is shown in FIG. 3. The photonic crystal may be a 1D, 2D, or 3D photonic crystal as described in Yablonovitch. A photonic crystal may guide surface states as described in A. I. Rahachou and I. V. Zozoulenko, "WAVEGUIDING PROPERTIES OF SURFACE STATES IN PHOTONIC CRYSTALS", Linkoping University, Department of Science and Technology, bearing a date of Oct. 31, 2005, pages 1-4 and located at http://www.itn.liu.se/meso-phot/publications/2005_waveguides_0510273.pdf, which is incorporated herein by reference and a copy of which is attached hereto as Appendix A.

Figure 4:
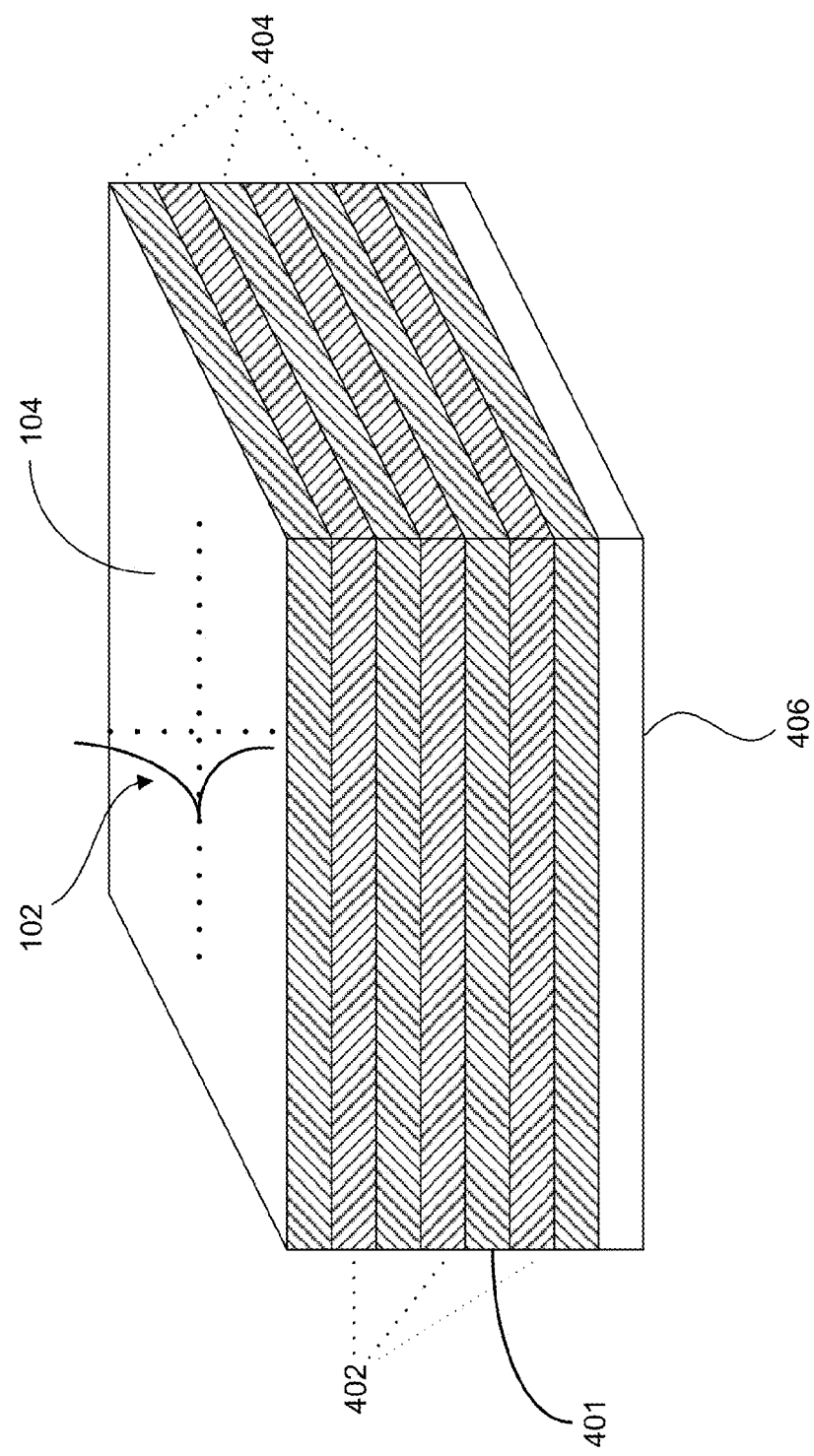
FIG. 4 shows a first photonic crystal structure including a first material and a second material.

FIG. 4 shows a surface state 102 at a boundary 104 of a first photonic crystal structure 401. The material or structure (not shown) forming the boundary 104 with the first photonic crystal structure 401 may be: air, vacuum, or its equivalent; a substantially homogeneous dielectric material; a second photonic crystal structure; or a different material or structure. The boundary 104, although shown as being substantially continuous and planar, may have a different shape. The surface state 102, although shown as including substantially exponential functions with a field maximum at the boundary 104, may include only approximately exponential functions, may be described by a different function, and/or may have a field maximum someplace other than the boundary 104. Further, although the surface state 102 is shown at a certain location on the first photonic crystal structure 401 for illustrative purposes, the spatial distribution of the surface state 102 may be anything.

FIG. 4 shows a first photonic crystal structure 401 including a 1D photonic crystal comprising layers of a first material 402 and a second material 404 fabricated on a substrate 406. Examples of 1D photonic crystals are given in Yablonovitch and in Y. Fink, J. N. Winn, S. Fan, C. Chen, J. Michel, J. D. Joannopoulos, and E. L. Thomas, "A DIELECTRIC OMNI-DIRECTIONAL REFLECTOR", Science, Nov. 27, 1998, Volume 282, pages 1679-1682, which is incorporated herein by reference.

Although the first photonic crystal structure 401 is shown having alternating layers of a first material 402 and a second material 404, where the layers have substantially equal thicknesses, the layer thicknesses and materials 402, 404 may be chosen according to the design of the first photonic crystal structure 401, and the layer thicknesses may vary. For example, the design of the first photonic crystal structure 401 may be such that the layer thicknesses are configured to vary, the layer thicknesses may vary slightly due to fabrication imperfections, the structure may include a top layer having a thickness inconsistent with the periodicity of the remainder of the first photonic crystal structure 401, and/or there may be other reasons for variations in the layer thicknesses. Although the first photonic crystal structure 401 is shown including two different materials 402, 404, it may include more than two types of materials. Further, although the first photonic crystal structure 401 is shown having seven layers in FIG. 4, it may have a different number of layers. The first photonic crystal structure 401 in FIG. 4 is shown as a 1D photonic crystal for exemplary purposes, but in other embodiments the first photonic crystal structure 401 may be a 2D or 3D photonic crystal structure, and may have variations analogous to those described for a 1D photonic crystal structure.

Figure 5:
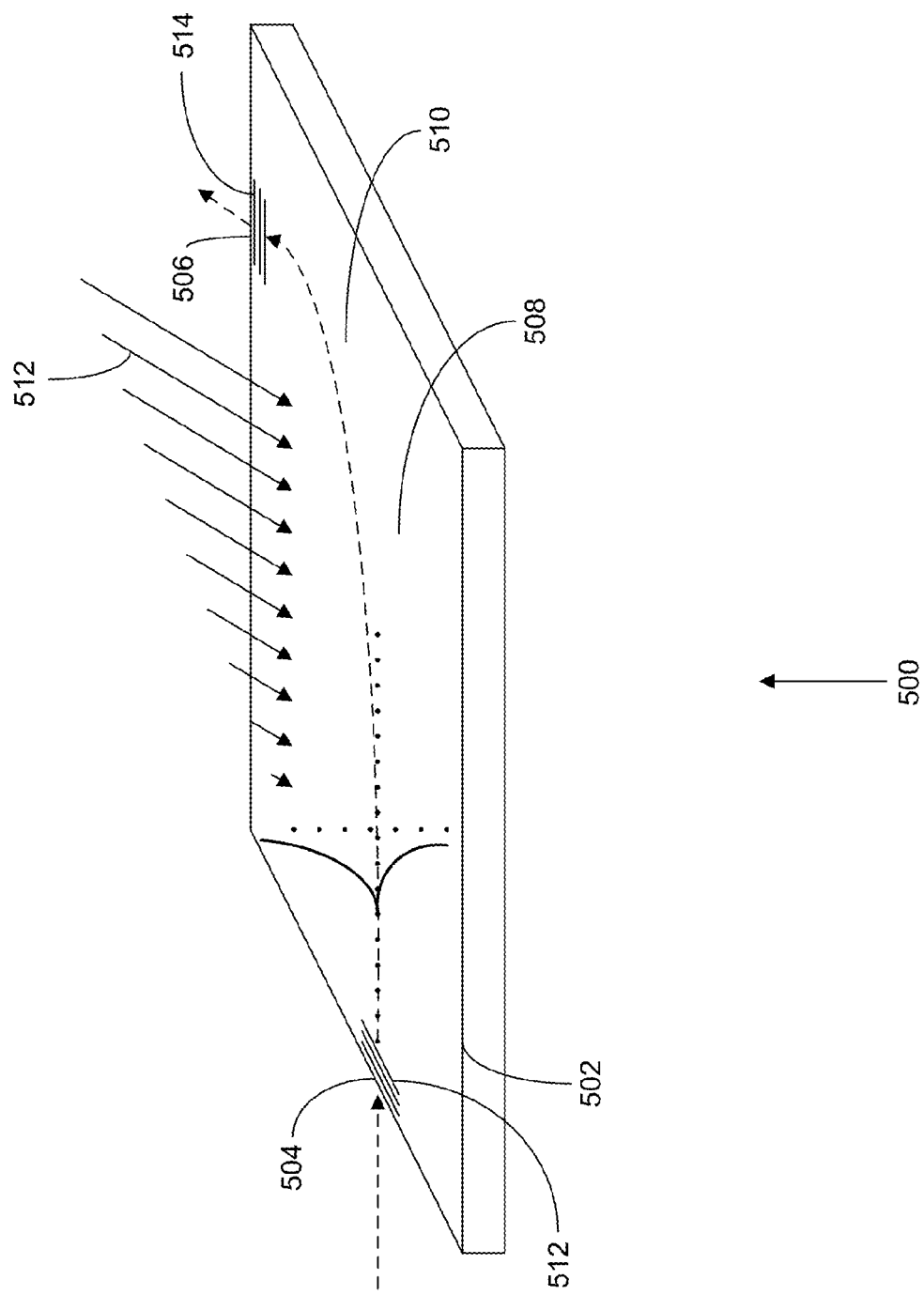
FIG. 5 shows an apparatus including a surface state support and a magnetically responsive structure.

In some embodiments, a magnetic field may control surface state propagation, as described in, "MAGNETO-PLASMA SURFACE WAVES IN METALS", K. W. Chiu and J. J. Quinn, Physical Review B, pages 4707-4709, Volume 5, Number 12, 15 Jun. 1972, which is incorporated herein by reference. For example, as shown in FIG. 5, an apparatus 500 comprises a first surface state support 502 including an input location 504 and an output location 506, and a first magnetically responsive structure 508 interposed at a first central location 510 intermediate the input location 504 and the output location 506, the first magnetically responsive structure 508 being responsive to a spatially-varying magnetic field 512 to produce a spatially-varying electromagnetic property proximate to the first surface state support 502 to control surface state propagation independently of a separate path-defining structure. In some embodiments, the spatially-varying electromagnetic property may be a spatially-varying permittivity.

In this embodiment the input location 504 and the output location 506 include gratings 512, 514, where the gratings 512, 514 are configured to convert electromagnetic energy to plasmon energy. The gratings 512, 514 are just one example of a structure for converting electromagnetic energy to plasmon energy, and other structures may be used, such as an array of particles, or a different structure. Further, although the input and output locations 504, 506 in FIG. 5 are configured to receive electromagnetic energy, in other embodiments the input and output locations 504, 506 may be arranged to receive surface state energy.

The spatially-varying electromagnetic property may vary as a function of frequency, and specifically, the spatial variation of the electromagnetic property may occur over a first frequency range, where the first frequency range may overlap (wholly or partially) with a second frequency range, where the second frequency range includes the frequencies of the surface states. The first and/or second frequency ranges may include, for example, optical frequencies or other frequency ranges.

The first surface state support 502 may include a material 106 having a negative real dielectric constant, such as a metal, a semiconductor, and/or a photonic crystal structure, as described with respect to FIGS. 1 and 4.

In FIG. 5, the first magnetically responsive structure 508 is substantially integral to the first surface state support 502. However in some embodiments the magnetically responsive structure 508 may form only a portion of the first surface state support 502. For example, a portion of the first surface state support 502 may include a magnetically responsive material.

Further, although the first surface state support 502 is shown as being substantially homogeneous, in other embodiments it may not be, such as in cases where the first surface state support is patterned.

In the embodiment shown in FIG. 5, the spatially-varying magnetic field 512 is shown as being substantially uni-directional and as having a magnitude that varies substantially monotonically in one direction. However, in other embodiments the direction and/or magnitude of the magnetic field 512 may have a different configuration. For example, the magnetic field 512 may have a magnitude which is substantially constant and a direction which varies spatially. There are many different configurations of magnetic field 512 that may be produced to create the desired effect on the apparatus 500.

Figure 6:
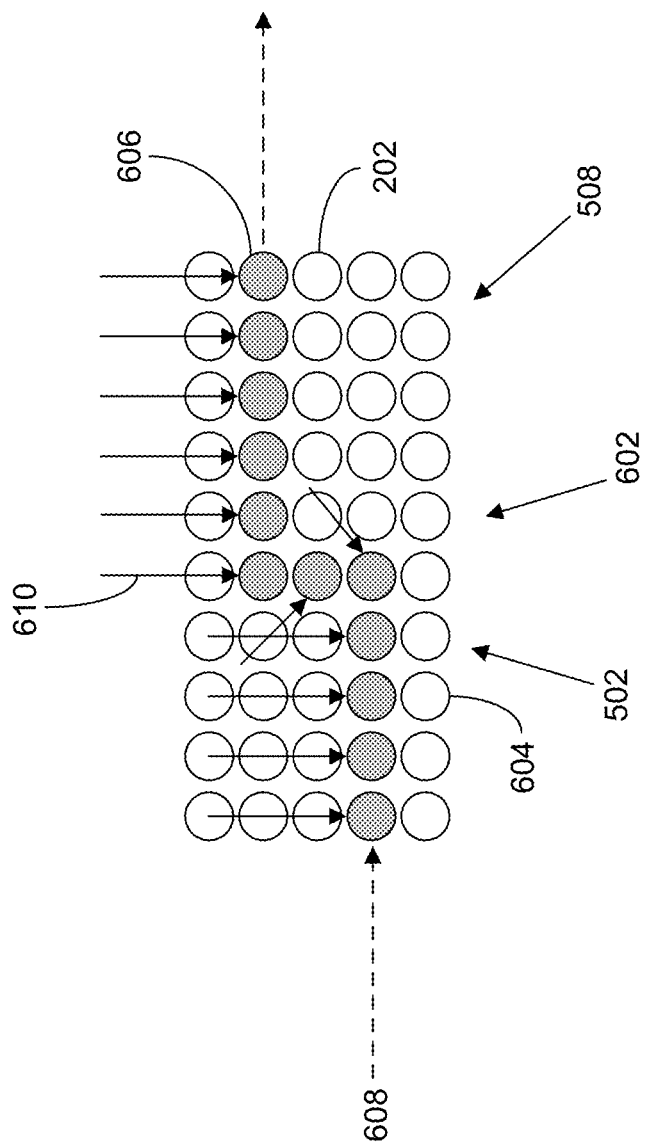
FIG. 6 shows an apparatus including a surface state support and a magnetically responsive structure.

FIG. 6 shows an apparatus similar to that of FIG. 5, wherein the first surface state support 502 includes an array of particles 602. In this embodiment, as well as that shown in FIG. 5, the magnetically responsive structure 508 is shown as being substantially integral to the first surface state support 502, i.e., in this embodiment each of the particles 604 in the array of particles 602 is magnetically responsive, such that the entire first surface state support 502 forms the magnetically responsive structure. This need not be the case, however, and in other embodiments the first surface state support 502 may include portions that are supportive of a surface state 102 but are not magnetically responsive.

In the embodiment of FIG. 6, the array of particles 602 is a substantially homogeneous array, wherein each of the particles 604 in the array 602 is substantially the same size and comprises substantially the same material or materials. The particles 602 in the array 604 are configured to respond to an applied magnetic field 610 to change their effective permittivity. In this way, the magnetic field 610 applied to particles 604 in the array 602 can select a path 606 (depicted by shaded particles) for plasmon energy.

As shown in FIG. 6, electromagnetic energy 608 is incident on a particle 604 having a magnetic field 610 applied to it. The magnitude and direction of the incident magnetic field 610 is selected such that it changes the permittivity of the particles 604 along the path 606 such that they support plasmon energy having an energy that is equivalent to that of the electromagnetic energy 608. The plasmon energy then propagates along the path 606 of the particles 604 that support plasmons of that energy.

The array of particles 602 shown in FIG. 6 is substantially two-dimensional, however in other embodiments the array may be substantially three-dimensional or one-dimensional.

Figure 7:
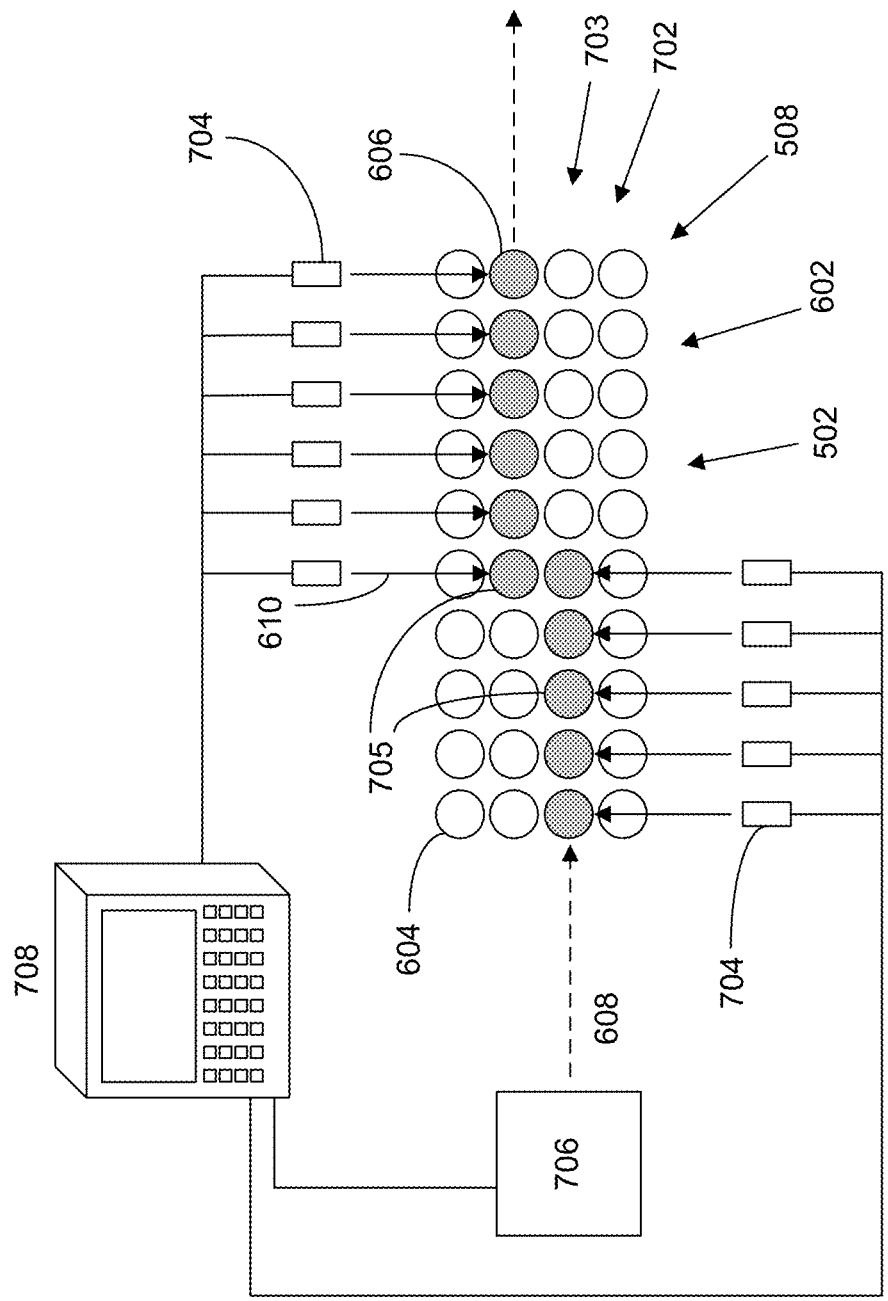
FIG. 7 shows a system including a plasmon route defining region.

In the embodiment of FIG. 7, a system comprises a first plasmon route defining region 702 (analogous to the first surface state support 502 of FIGS. 5 and 6) including a magnetically interactive portion 703 (analogous to the first magnetically responsive structure 508 of FIGS. 5 and 6) responsive to a first magnetic field 610 to define a propagation route 705 (depicted by shaded particles and analogous to the path 606 of FIG. 6) of a first plasmon signal absent a separate routing structure.

In this embodiment, the first plasmon route defining region 702 includes an array of particles 602 that are supportive of plasmon energy and are sufficiently proximate to one another to transmit plasmon energy to their nearest-neighbors. Further, the magnetically interactive portion 703, in the embodiment of FIG. 7, includes all of the particles 604 in the array. The operation is similar to that shown in FIG. 6, wherein the first magnetic field 610 is configured to determine the propagation route 705 of the first plasmon signal.

Although the embodiment of FIG. 7 is shown such that the first plasmon route defining region 702 includes an array of particles 604, in other embodiments the first plasmon route defining region 702 may have a different configuration. For example, in some embodiments the first plasmon route defining region 702 may include a substantially continuous surface such as the first surface state support 502 shown in FIG. 5. Although two different types of plasmon route defining regions 702 are shown here as exemplary embodiments, in other embodiments the first plasmon route defining region 702 may have a different configuration.

In this embodiment, magnetic field sources 704 are configured to produce the first magnetic field 610. The embodiment further comprises a processor, wherein the processor is operably coupled to the magnetic field sources 704 to turn them on or off. Further, in this embodiment each of the particles 604 in the array that form the first plasmon route defining region 702 is responsive to a magnetic field, such that the entire first plasmon route defining region 702 is also the magnetically interactive portion 703. However, in other embodiments the magnetically interactive portion 703 may form just a part of the first plasmon route defining region 702.

In some embodiments, the magnetic field sources 704 may be electromagnets, permanent magnets, a mixture of both, or a different kind of magnet.

The distribution and direction of the first magnetic field 610 shown in FIG. 7 is one exemplary embodiment and many other magnetic field distributions may be employed depending on the application. For example, the magnetic field strength and direction may vary spatially. Or, a configuration inverse to that shown in FIG. 7 may be employed, wherein a magnetic field is applied to areas (for example, particles 604) where the plasmon is prohibited from propagating by moving the particle 604 off of plasmon resonance, and the plasmon signal propagates along the particles 604 that do not have a magnetic field 610 applied to them. These are just a few examples of how the embodiment of FIG. 7 may be adjusted according to a particular design, and one skilled in the art may tailor the design for their purposes.

In the exemplary embodiment of FIG. 7, the processor 708 is shown as being operably coupled to each of the magnetic field sources 704 and the source of input energy 706. However, in some embodiments the processor 708 may be operably coupled to more or less components than is shown in FIG. 7. For example, the processor 708 may be operably coupled to an array including thousands of magnetic field sources 704, and/or the processor may be operably coupled to elements configured to move portions of the system, such as MEMS devices configured to move the magnetic field sources, or other devices configured to provide motion to one or more of the components shown in FIG. 7.

Figure 8:
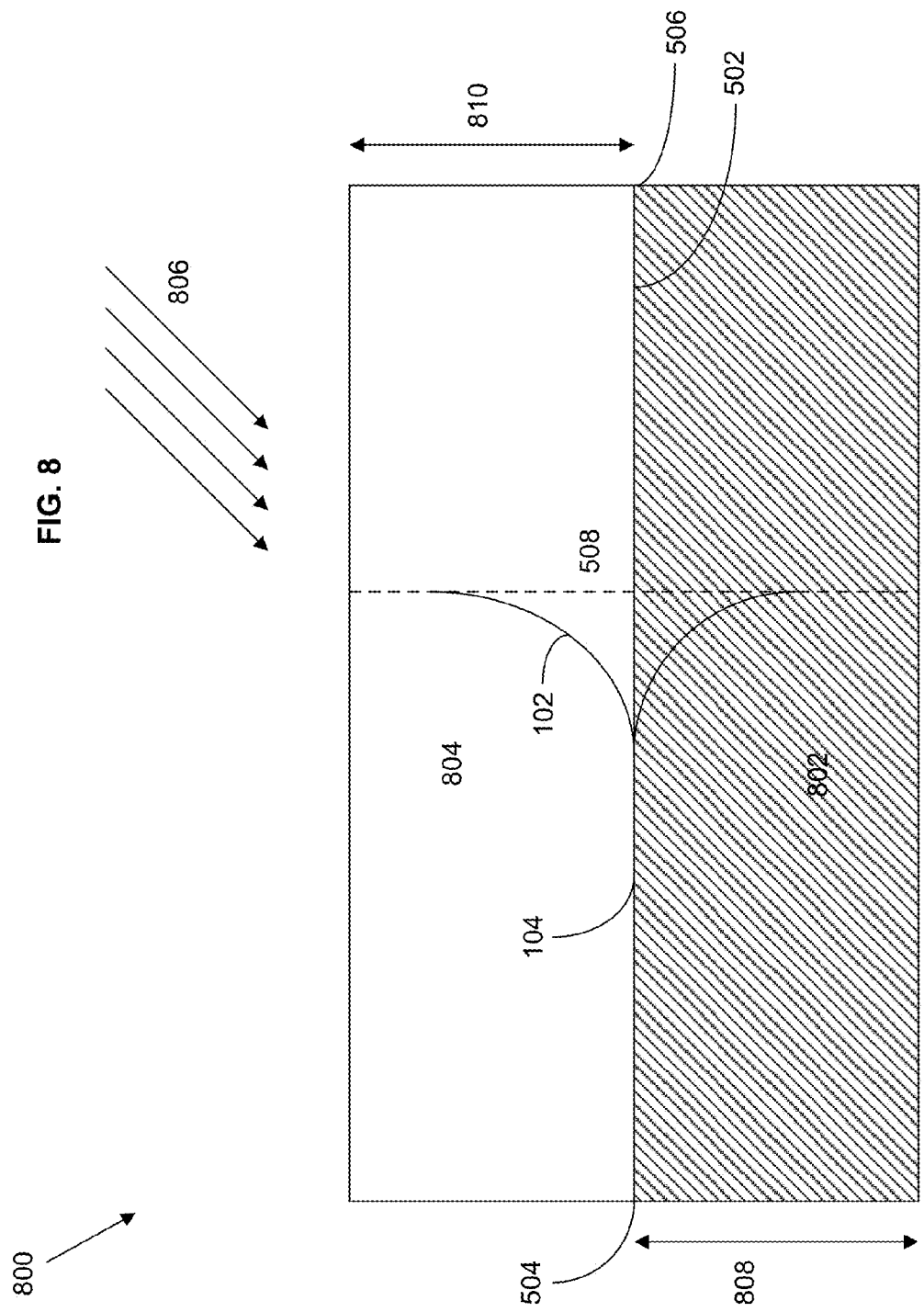
FIG. 8 shows a side cross-section of an apparatus comprising a first surface state support.
Figure 9:
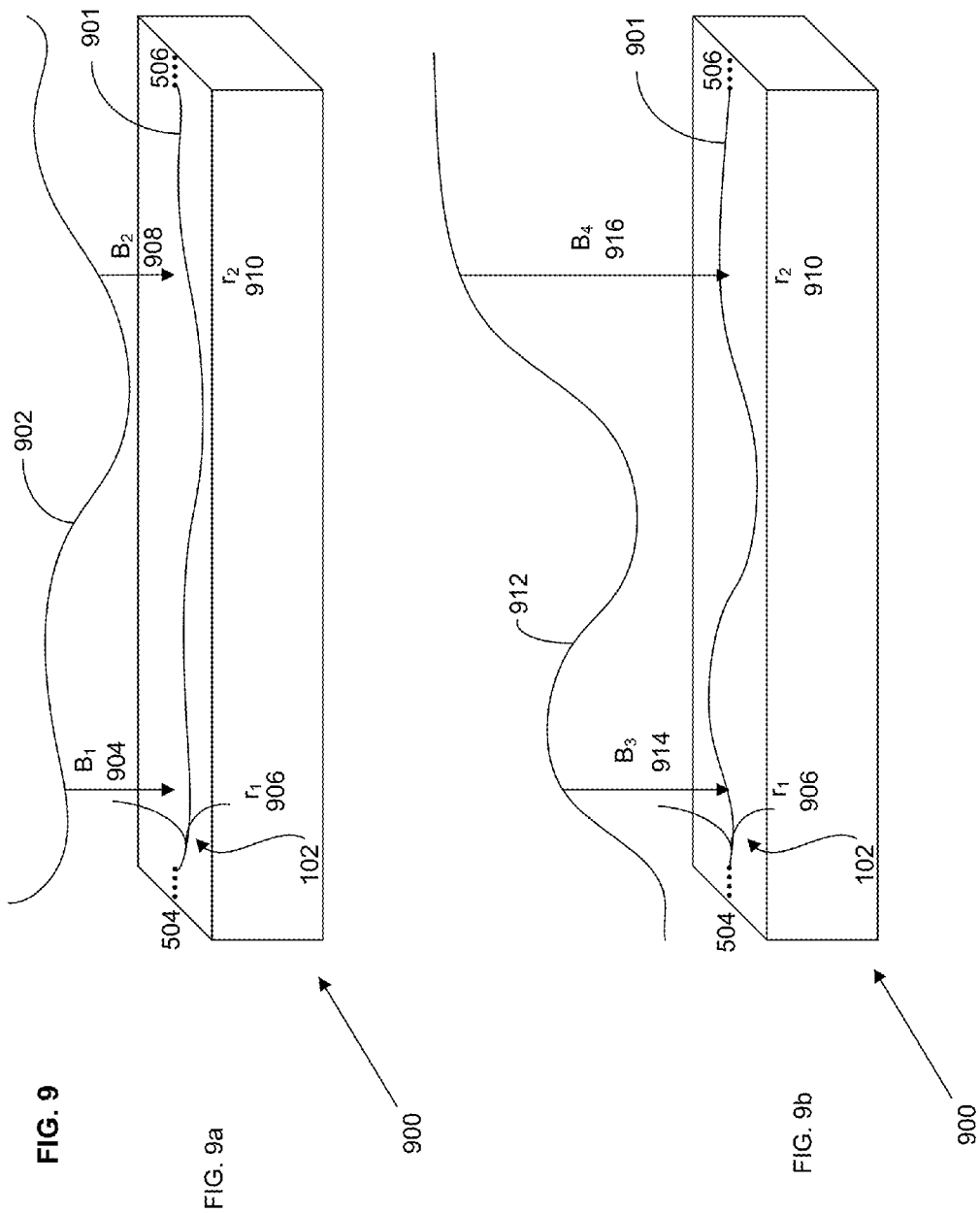
FIG. 9a shows an apparatus supportive of a surface state, and a magnetic field.
FIG. 9b shows an apparatus supportive of a surface state, and a magnetic field.

FIG. 8 shows a side cross-section of an apparatus 800 comprising a first surface state support 502 including an input location 504 and an output location 506, the first surface state support 502 being defined by a boundary 104 between a first material 802 and a second material 804, wherein each of the first material 802 and the second material 804 is optically thick; and a first magnetically responsive structure 508 interposed at a first central location 510 intermediate the input location 504 and the output location 506, the first magnetically responsive structure 508 being responsive to a magnetic field 806 to control surface state propagation by establishing a first permittivity proximate to the first surface state support 502. The apparatus 800 is similar to that of FIG. 5, where FIG. 5 does not explicitly show the second material 804.

Generally, in this embodiment and the other embodiments presented in FIGS. 1-17, the input location 504 and the output location 506 may be configured to receive electromagnetic energy, surface state energy, and/or a different type of energy. For example, where the input location 504 and/or the output location 506 are configured to receive electromagnetic energy as in FIG. 5, the input location and/or the output location 506 may include a grating 512, 514 or other structure configured to convert the electromagnetic energy into surface state energy.

In this embodiment the first magnetically responsive structure 508 is integral to the first material 802 and the second material 804. As described in Chiu et al., applying a magnetic field such as 806 to a configuration supportive of a surface state 102 may change the properties of the surface state 102, thereby allowing control of the surface state 102 via the application of a magnetic field 806. The spatial distribution of the magnetic field 806 may be selected such that it steers a surface state that propagates along the boundary 104.

The first material 802 and the second material 804 include materials whose real dielectric constants have opposite signs. For example, the first material 802 may include a metal and the second material 804 may include a dielectric. Different configurations supportive of surface states have been described in more detail with reference to FIGS. 1-4.

The magnetic field 806 in FIG. 8 is shown as being substantially constant in magnitude and direction. However, this magnetic field 806 is shown for illustrative purposes, and in other embodiments the magnetic field 806 may vary in magnitude and/or direction, may vary temporally, and/or may vary in a different way.

In this embodiment, optically thick is defined such that the thicknesses 808, 810 of the first and second material 802, 804 are great enough that the amplitude of a surface state 102 excited on one side of either the first material 802 or the second material 804 will be less than 1/100th of its maximum on the other side of the material. Although the thicknesses 808, 810 are shown as being substantially constant along the length of the apparatus 800, in some embodiments the thicknesses 808, 810 may vary, along the length of the apparatus and/or along another dimension, such as the width.

In some embodiments the first material 802 may include a photonic crystal. In this case the second material 804 may include: a dielectric; a photonic crystal different from that of the first material 802; and/or a different type of material. Further, the boundary 104 may form a photonic crystal surface state support.

FIGS. 9a and 9b show an apparatus 900 on which a surface state 102 is induced at a first input location 504. As shown in FIG. 9a, a propagation path 901 for the surface state 102 is defined by imposing a spatially-varying magnetic field 902 having a first non-zero distribution, wherein the first non-zero distribution has a first non-zero magnitude $B_1$ (904) at a first magnetic field location $r_1$ (906) on the propagation path 901 and a second non-zero magnitude $B_2$ (908) at a second magnetic field location $r_2$ (910) on the propagation path 901, the first spatially-varying magnetic field 902 being configured to produce a spatially-varying permittivity, the propagation path 901 extending from the first input location 504 to a first output location 506 spatially separated from the first input location 504. The propagation path 901 may further be varied by changing the first spatially-varying magnetic field 902 to a second magnetic field 912, shown in FIG. 9b, having a second non-zero distribution, wherein the second non-zero distribution has a third non-zero magnitude $B_3$ (914) at the first magnetic field location $r_1$ (906) and a fourth non-zero magnitude $B_4$ (916) at the second magnetic field location $r_2$ (910), and wherein the ratio of B4/B3 is different from the ratio of B2/B1.

The apparatus 900 is similar to those shown in FIGS. 5 and 8, and FIGS. 9a and 9b show how the spatial distribution of a magnetic field (such as 902 and/or 912) may vary, spatially and/or temporally. This variation, however, is just one exemplary embodiment, and there are many ways in which a magnetic field (such as 902 and/or 912) may vary, spatially and/or temporally, and there are many ways in which a varying magnetic field may control surface state energy.

Although the spatially-varying magnetic field 902 and the second magnetic field 912 are shown spanning the entire distance between the first input location 504 and the first output location 506, in other embodiments the magnetic fields 902 and/or 912 may span only a portion of the distance between the first input location 504 and the first output location 506. Further, although only one input location 504 and one output location 506 are shown, other embodiments may include more than one input location 504 and/or more than one output location 506. Further, although the spatially-varying magnetic field 902 and the second magnetic field 912 are shown having a magnitude varying along one direction, in other embodiments it may vary in two or three orthogonal directions. The spatially-varying magnetic field 902 and the second magnetic field 912 may vary monotonically, non-monotonically, or in a different way. Or, the magnitude of the second magnetic field 912 may be substantially constant. The direction of the spatially-varying magnetic field 902 and/or the second magnetic field 912 may vary, along with or instead of the magnitudinal variation.

Figure 10:
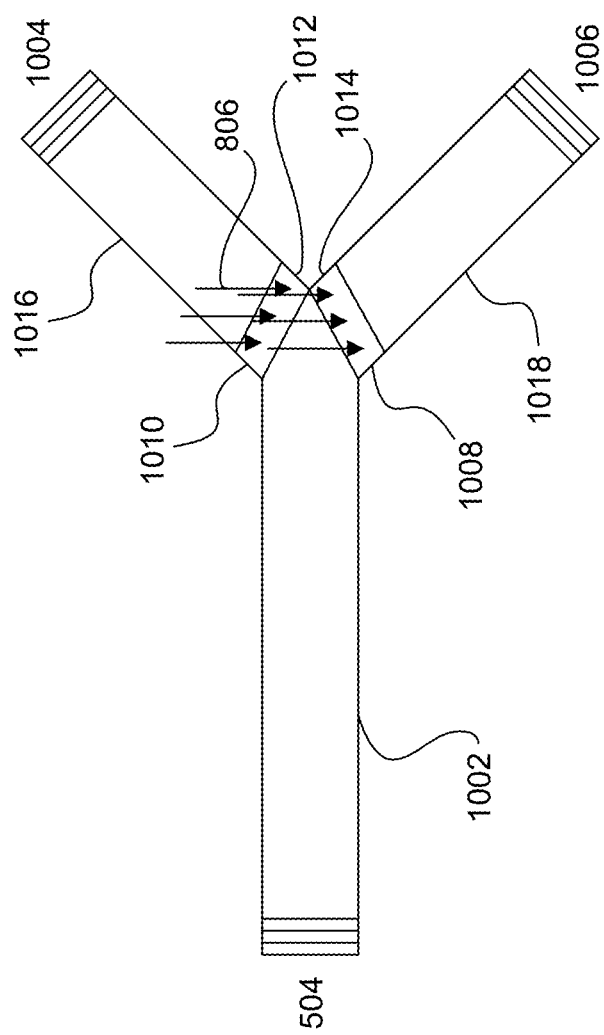
FIG. 10 shows an apparatus comprising a surface state support including an input location and two output locations and two magnetically responsive structures.

FIG. 10 shows a top view of an apparatus comprising a first surface state support 1002 including an input location 504 and two output locations (1004 and 1006); and two magnetically responsive structures (1008 and 1010) interposed at central locations (1012, 1014) intermediate the input location 504 and the two output locations (1004, 1006), the magnetically responsive structures (1008, 1010) being responsive to a magnetic field 806 to block surface state propagation to at least one of the two output locations 1008 and 1010.

The surface state support 1002, although shown as being substantially continuous, may not be continuous, and may include, for example, an array of particles 202, as shown in FIGS. 2, 6, and 7.

Further, although FIG. 10 shows two branches 1016, 1018 and two output locations 1004, 1006, other embodiments may include more than two branches 1016, 1018 and/or more than two output locations 1004, 1006.

The magnetically responsive structures 1008, 1010 may in some cases include a material different from the materials forming the remainder of the surface state support 1002, or the material may be the same as that that forms the remainder of the surface state support. For example, where the material forming the magnetically responsive structures 1008, 1010 is the same as the materials forming the reminder of the surface state support 1002, a magnetic field 806 may be applied to one or both magnetically responsive structures 1008, 1010 to block propagation of a surface state 102 to one or both output locations 1004, 1006. However, where the material forming the magnetically responsive structures 1008, 1010 is different from the material forming the remainder of the surface state support 1002, the magnetically responsive structures 1008, 1010 may block surface state propagation with no magnetic field applied, and may allow surface state propagation with a selected magnetic field.

Although the magnetically responsive structures 1008, 1010 are shown located at the bases of the branches 1016, 1018, in other embodiments the magnetically responsive structures 1008, 1010 may be located at a different place, such as further along on the branch, or in a different embodiment there may only be one magnetically responsive structure located at the branching location of the branches 1016, 1018 that is configured to pass or block surface state propagation to both branches 1016, 1018 simultaneously.

Figure 11:
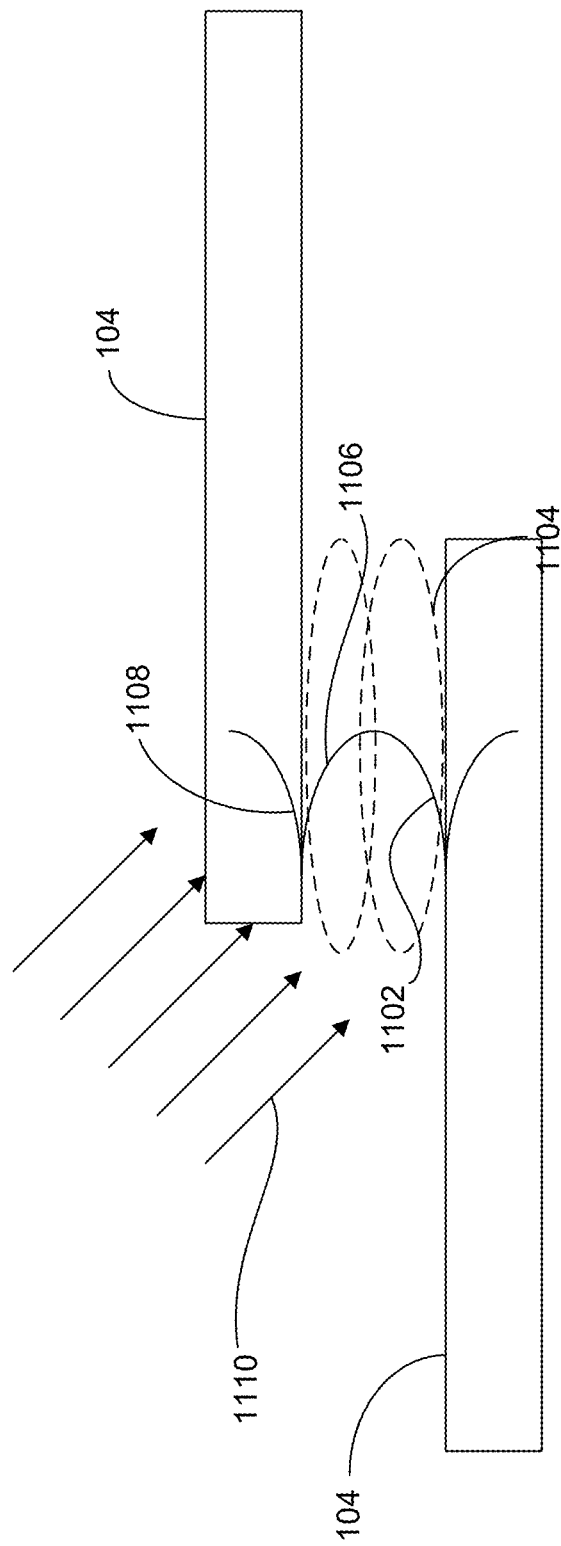
FIG. 11 shows an apparatus supportive of a surface state mode that is coupled to a second surface state mode.
Figure 12:
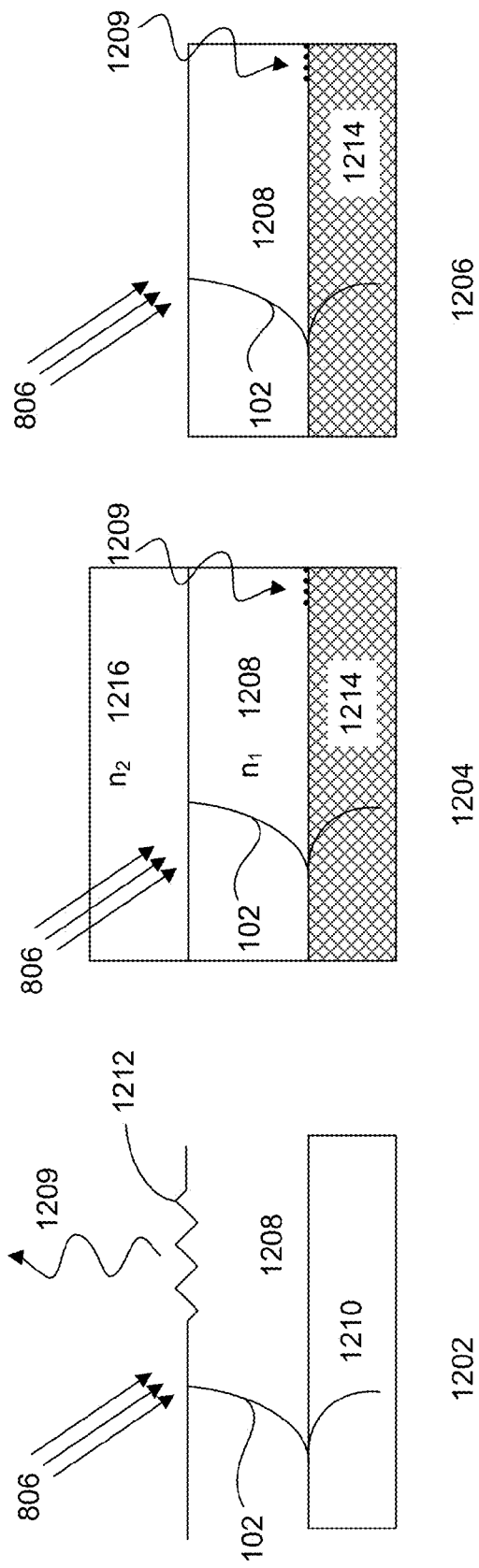
FIG. 12a shows a surface state support including a conductor and a dielectric region.
FIG. 12b shows a surface state support including a photonic crystal, a first dielectric region, and a second dielectric region.
FIG. 12c shows a surface state support including a photonic crystal and a first dielectric region.

FIG. 11 shows an apparatus supportive of a first surface state mode 1102 in a first dielectric region 1104, where the first surface state mode 1102 is coupled to a second surface state mode 1106 in a second dielectric region 1108, the first dielectric region 1104 and the second dielectric region 1108 being at least partially overlapping. In this embodiment, the coupling of the first surface state mode 1102 and the second surface state mode 1106 may be varied by applying a first magnetic field 1110 to at least one of the first region 1104 and the second region 1108.

The magnetic field 1110 in FIG. 11 is shown as being substantially constant in magnitude and direction. However, this magnetic field 1110 is shown for illustrative purposes, and in other embodiments the magnetic field 1110 may vary in magnitude and/or direction, may vary temporally, and/or may vary in a different way.

The first and second dielectric regions 1104, 1106 are described by an oval shape in FIG. 11, however this is for illustrative purposes only, as the surface state mode 1102 decays according to a power law away from the boundary 104.

FIGS. 12a, 12b, and 12c show embodiments of apparatus (1202, 1204, and 1206) for varying the coupling between a surface state 102 in a first dielectric region 1208 and a radiative mode 1209 by varying a magnetic field 806 applied to the first dielectric region 1208, the applied magnetic field 806 being configured to vary the permittivity of at least a portion of the first dielectric region 1208.

FIG. 12a shows an embodiment having a conductor 1210 in intimate contact with the first dielectric region 1208. The first dielectric region 1208 is configured with a grating 1212 such that evanescent energy proximate to the grating 1212 is converted into radiative energy in the radiative mode 1209. By varying the applied magnetic field 806, the spatial profile of the surface state 102 changes and it's coupling to the radiative mode 1209 changes.

FIG. 12b shows an embodiment having a photonic crystal 1214 proximate to the first dielectric region 1208, wherein the first dielectric region 1208 is proximate to a second dielectric region 1216. In the embodiment of FIG. 12b, the first dielectric region 1208 has a variable dielectric constant $n_1(B)$ that is a function of an applied magnetic field 806, where $n_1(B=0)$ allows plasmon propagation in a first frequency range, and wherein $n_1(B=B_1)=n_2$, where $n_2$ is the dielectric constant of the second dielectric region 1216, and where $n_2$ prohibits plasmon propagation in the first frequency range.

FIG. 12c shows an embodiment having a photonic crystal 1214 proximate to the first dielectric region 1208, where in this case the first dielectric region 1208 is selected to have a variable refractive index $n(B)$, where depending on the applied magnetic field 806, the refractive index $n(B)$ may be such that it supports or does not support a surface state.

Figure 13:
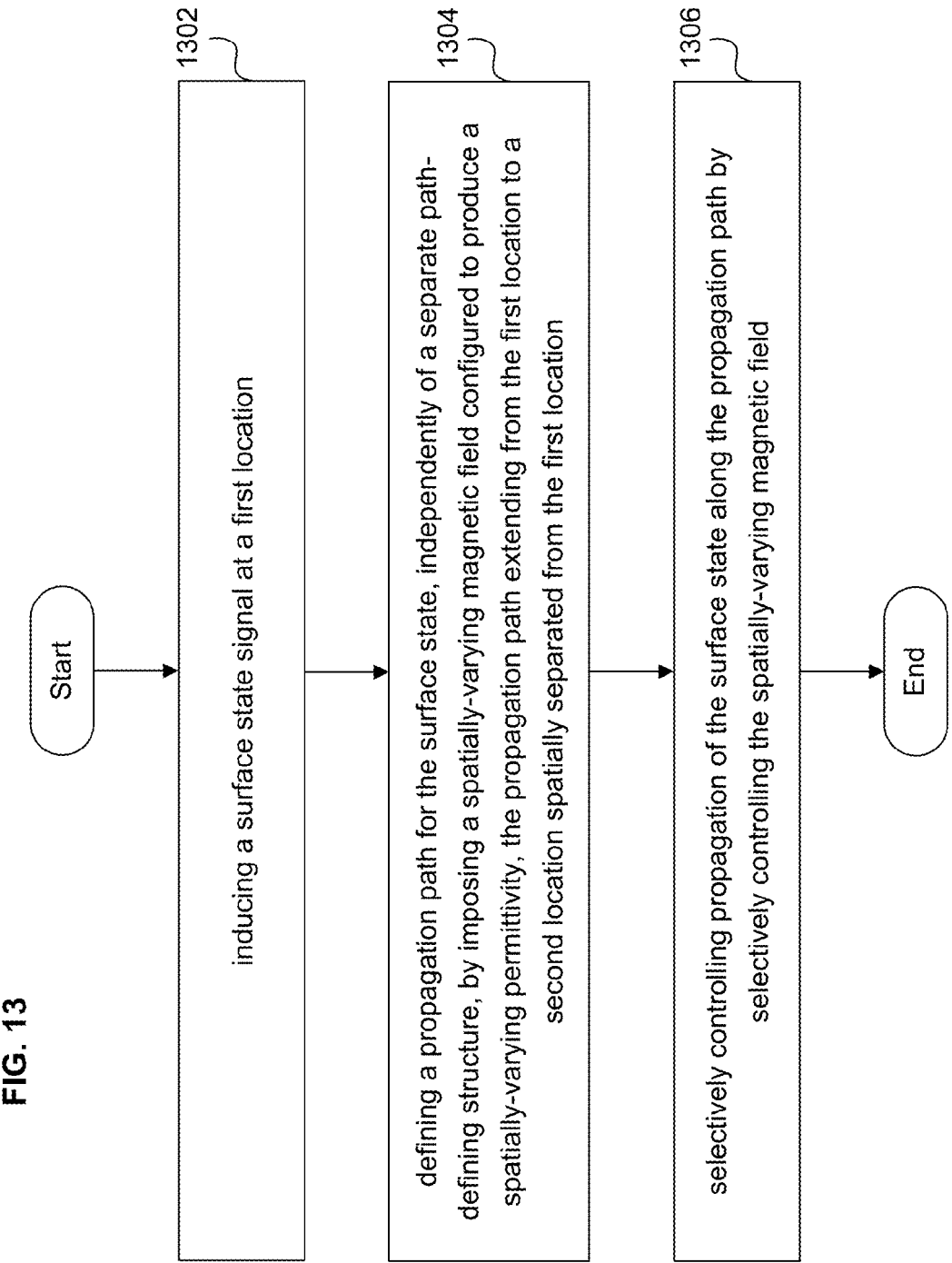
FIG. 13 is a flow chart depicting a method.

In one embodiment, depicted in the Flow Chart of FIG. 13, a method comprises: (1302) inducing a surface state signal at a first location; (1304) defining a propagation path for the surface state, independently of a separate path-defining structure, by imposing a spatially-varying magnetic field configured to produce a spatially-varying permittivity, the propagation path extending from the first location to a second location spatially separated from the first location; and (1306) selectively controlling propagation of the surface state along the propagation path by selectively controlling the spatially-varying magnetic field.

Figure 14:
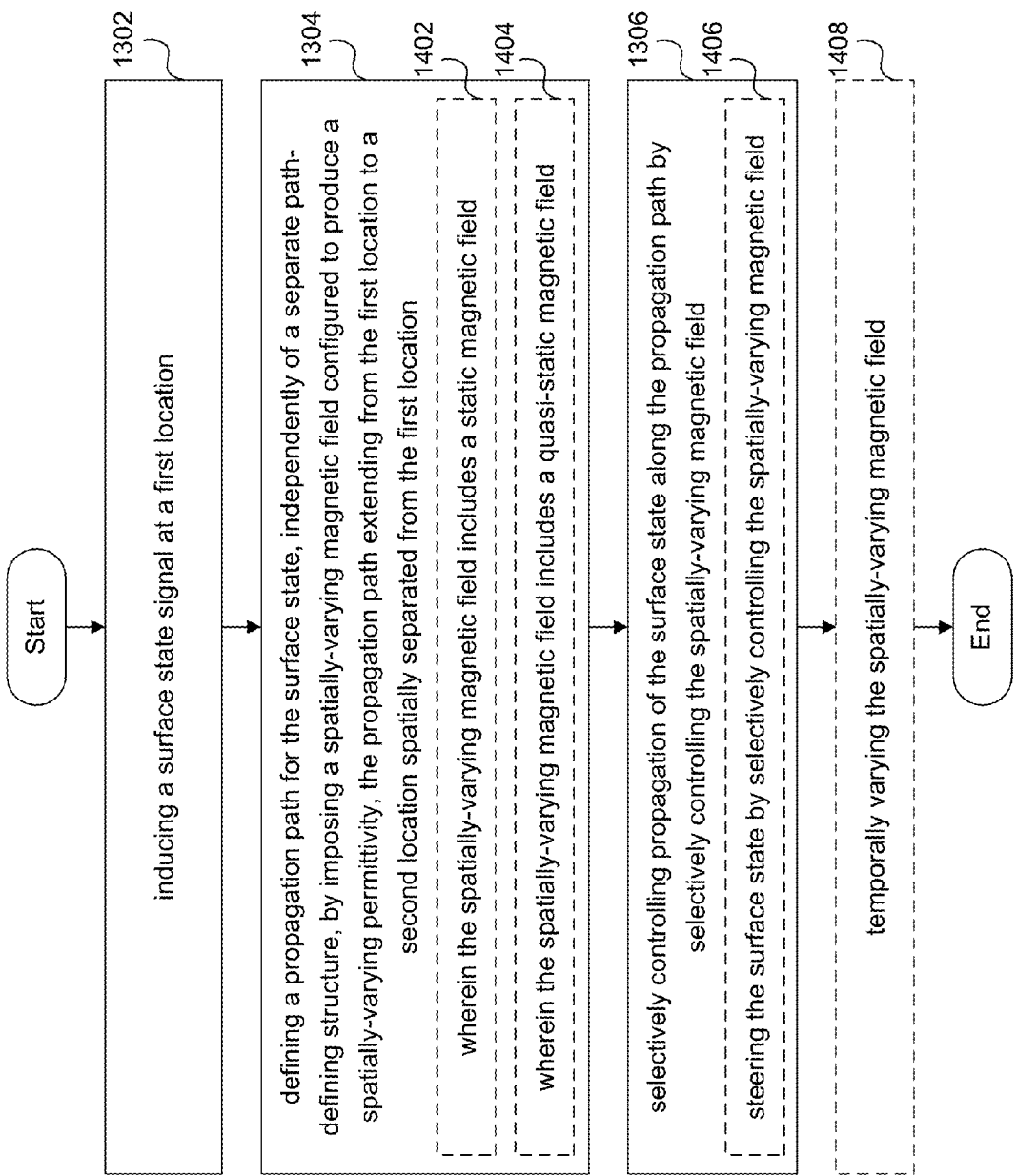

As depicted in the flow chart of FIG. 14, (1402) the spatially-varying magnetic field may include a static magnetic field, and/or (1404) the spatially-varying magnetic field may include a quasi-static magnetic field. (1306) Selectively controlling propagation of the surface state along the propagation path by selectively controlling the spatially-varying magnetic field may further include (1406) steering the surface state by selectively controlling the spatially-varying magnetic field. The method may further comprise (1408) temporally varying the spatially-varying magnetic field.

Figure 15:
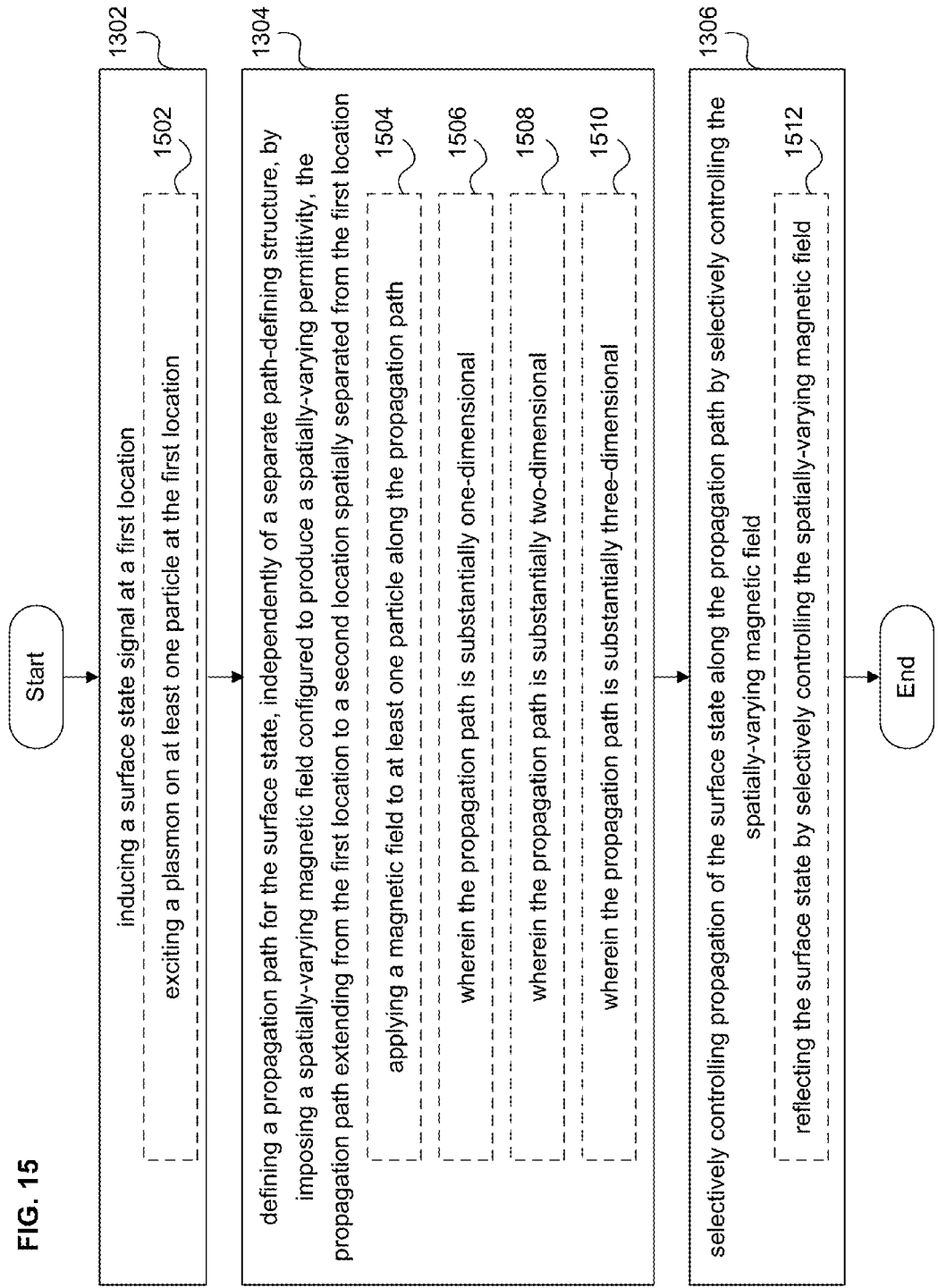

As depicted in the flow chart of FIG. 15, (1302) inducing a surface state signal at a first location may further include (1502) exciting a plasmon on at least one particle at the first location, wherein (1304) defining a propagation path for the surface state, independently of a separate path-defining structure, by imposing a spatially-varying magnetic field configured to produce a spatially-varying permittivity, the propagation path extending from the first location to a second location spatially separated from the first location, may further include (1504) applying a magnetic field to at least one particle along the propagation path. In some embodiments, (1504) the propagation path may be substantially one-dimensional, (1506) the propagation path may be substantially two-dimensional, and/or (1508) the propagation path may be substantially three-dimensional. In some embodiments, (1306) selectively controlling propagation of the surface state along the propagation path by selectively controlling the spatially-varying magnetic field may further include (1512) reflecting the surface state by selectively controlling the spatially-varying magnetic field.

Figure 16:
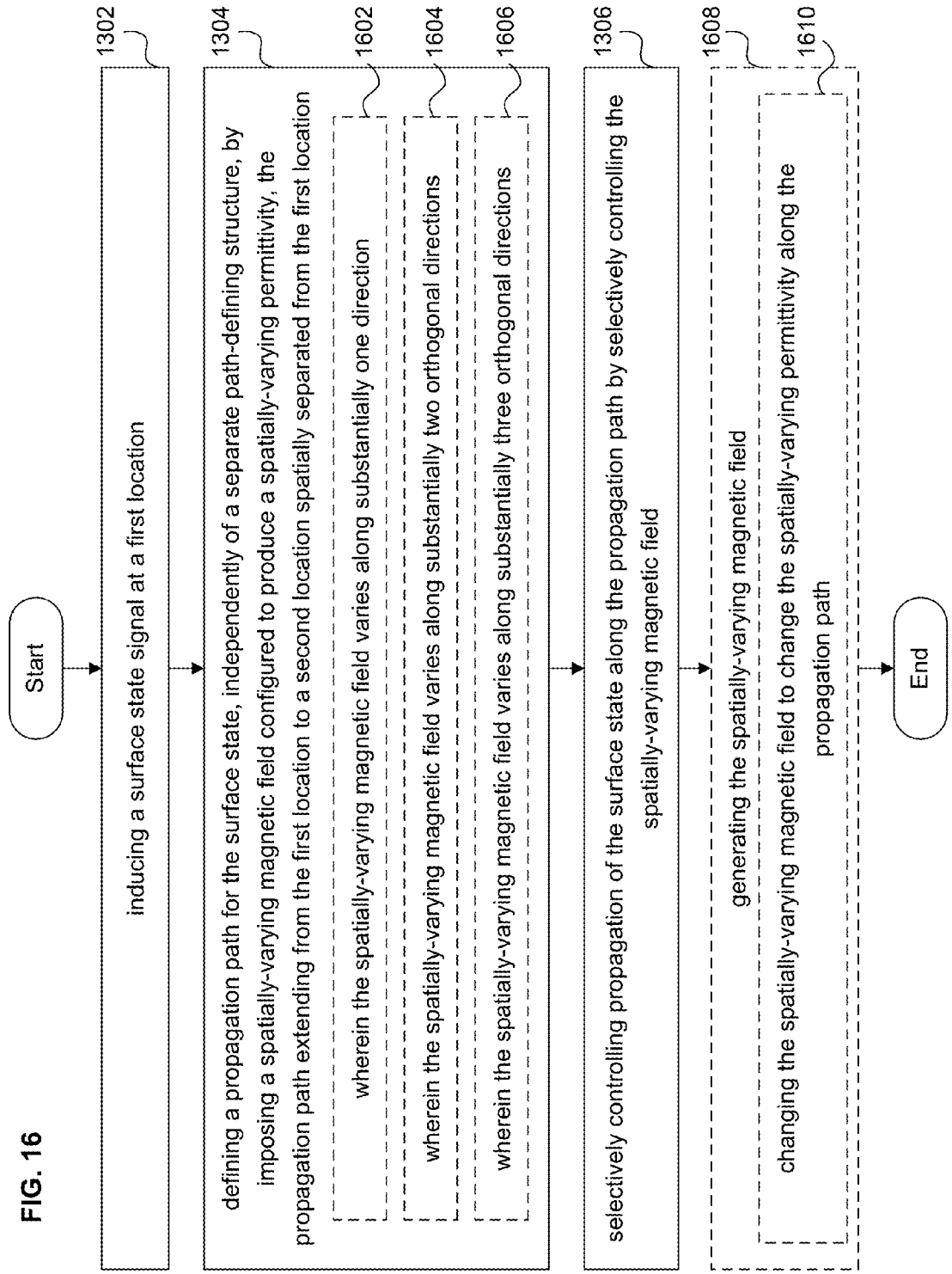

As depicted in the flow chart of FIG. 16, (1602) the spatially-varying magnetic field may vary along substantially one direction, (1604) the spatially-varying magnetic field may vary along substantially two orthogonal directions, and/or (1606) the spatially-varying magnetic field may vary along substantially three orthogonal directions. The method may further comprise (1608) generating the spatially-varying magnetic field, and (1610) changing the spatially-varying magnetic field to change the spatially-varying permittivity along the propagation path.

As depicted in the flow chart of FIG. 17, (1702) the surface state may include plasmon energy, and/or (1704) the surface state may include a photonic crystal surface state. In some embodiments, (1706) the spatially-varying permittivity may vary in a first frequency range, and the surface state may have a second frequency range, wherein the first frequency range may overlap at least in part with the second frequency range. In some embodiments, (1708) the first frequency range may include optical frequencies, and/or (1710) the second frequency range may include optical frequencies.

Although not explicitly shown in each figure, any of the embodiments shown in FIGS. 1-17 may include system-level components as those shown in FIG. 7. Such components may include, for example, one or more magnetic field sources 704, one or more sources of input energy 706, and/or one or more processors 708. The system shown in FIG. 7 includes a single processor configured to control and/or receive information from the magnetic field sources 704 and the source of input energy 706. However, in other embodiments not every component may be operably connected to the processor, and/or each component may be connected to a different processor. When configuring a system, many different arrangements including system-level apparatus may be selected to achieve the desired control and/or processing.

Those having skill in the art will recognize that the state of the art has progressed to the point where there is little distinction left between hardware, software, and/or firmware implementations of aspects of systems; the use of hardware, software, and/or firmware is generally (but not always, in that in certain contexts the choice between hardware and software can become significant) a design choice representing cost vs. efficiency tradeoffs. Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software, and or firmware.

In some implementations described herein, logic and similar implementations may include software or other control structures suitable to operation. Electronic circuitry, for example, may manifest one or more paths of electrical current constructed and arranged to implement various logic functions as described herein. In some implementations, one or more media are configured to bear a device-detectable implementation if such media hold or transmit a special-purpose device instruction set operable to perform as described herein. In some variants, for example, this may manifest as an update or other modification of existing software or firmware, or of gate arrays or other programmable hardware, such as by performing a reception of or a transmission of one or more instructions in relation to one or more operations described herein. Alternatively or additionally, in some variants, an implementation may include special-purpose hardware, software, firmware components, and/or general-purpose components executing or otherwise invoking special-purpose components. Specifications or other implementations may be transmitted by one or more instances of tangible transmission media as described herein, optionally by packet transmission or otherwise by passing through distributed media at various times.

Alternatively or additionally, implementations may include executing a special-purpose instruction sequence or otherwise invoking circuitry for enabling, triggering, coordinating, requesting, or otherwise causing one or more occurrences of any functional operations described above. In some variants, operational or other logical descriptions herein may be expressed directly as source code and compiled or otherwise invoked as an executable instruction sequence. In some contexts, for example, C++ or other code sequences can be compiled directly or otherwise implemented in high-level descriptor languages (e.g., a logic-synthesizable language, a hardware description language, a hardware design simulation, and/or other such similar mode(s) of expression). Alternatively or additionally, some or all of the logical expression may be manifested as a Verilog-type hardware description or other circuitry model before physical implementation in hardware, especially for basic operations or timing-critical applications. Those skilled in the art will recognize how to obtain, configure, and optimize suitable transmission or computational elements, material supplies, actuators, or other common structures in light of these teachings.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link (e.g., transmitter, receiver, transmission logic, reception logic, etc.), etc.).

In a general sense, those skilled in the art will recognize that the various embodiments described herein can be implemented, individually and/or collectively, by various types of electro-mechanical systems having a wide range of electrical components such as hardware, software, firmware, and/or virtually any combination thereof; and a wide range of components that may impart mechanical force or motion such as rigid bodies, spring or torsional bodies, hydraulics, electromagnetically actuated devices, and/or virtually any combination thereof. Consequently, as used herein "electro-mechanical system" includes, but is not limited to, electrical circuitry operably coupled with a transducer (e.g., an actuator, a motor, a piezoelectric crystal, a Micro Electro Mechanical System (MEMS), etc.), electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of memory (e.g., random access, flash, read only, etc.)), electrical circuitry forming a communications device (e.g., a modem, communications switch, optical-electrical equipment, etc.), and/or any non-electrical analog thereto, such as optical or other analogs. Those skilled in the art will also appreciate that examples of electro-mechanical systems include but are not limited to a variety of consumer electronics systems, medical devices, as well as other systems such as motorized transport systems, factory automation systems, security systems, and/or communication/computing systems. Those skilled in the art will recognize that electro-mechanical as used herein is not necessarily limited to a system that has both electrical and mechanical actuation except as context may dictate otherwise.

In a general sense, those skilled in the art will recognize that the various aspects described herein which can be implemented, individually and/or collectively, by a wide range of hardware, software, firmware, and/or any combination thereof can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of memory (e.g., random access, flash, read only, etc.)), and/or electrical circuitry forming a communications device (e.g., a modem, communications switch, optical-electrical equipment, etc.). Those having skill in the art will recognize that the subject matter described herein may be implemented in an analog or digital fashion or some combination thereof.

Those skilled in the art will recognize that at least a portion of the devices and/or processes described herein can be integrated into an image processing system. Those having skill in the art will recognize that a typical image processing system generally includes one or more of a system unit housing, a video display device, memory such as volatile or non-volatile memory, processors such as microprocessors or digital signal processors, computational entities such as operating systems, drivers, applications programs, one or more interaction devices (e.g., a touch pad, a touch screen, an antenna, etc.), control systems including feedback loops and control motors (e.g., feedback for sensing lens position and/or velocity; control motors for moving/distorting lenses to give desired focuses). An image processing system may be implemented utilizing suitable commercially available components, such as those typically found in digital still systems and/or digital motion systems.

Those skilled in the art will recognize that at least a portion of the devices and/or processes described herein can be integrated into a data processing system. Those having skill in the art will recognize that a data processing system generally includes one or more of a system unit housing, a video display device, memory such as volatile or non-volatile memory, processors such as microprocessors or digital signal processors, computational entities such as operating systems, drivers, graphical user interfaces, and applications programs, one or more interaction devices (e.g., a touch pad, a touch screen, an antenna, etc.), and/or control systems including feedback loops and control motors (e.g., feedback for sensing position and/or velocity; control motors for moving and/or adjusting components and/or quantities). A data processing system may be implemented utilizing suitable commercially available components, such as those typically found in data computing/communication and/or network computing/communication systems.

Those skilled in the art will recognize that it is common within the art to implement devices and/or processes and/or systems, and thereafter use engineering and/or other practices to integrate such implemented devices and/or processes and/or systems into more comprehensive devices and/or processes and/or systems. That is, at least a portion of the devices and/or processes and/or systems described herein can be integrated into other devices and/or processes and/or systems via a reasonable amount of experimentation. Those having skill in the art will recognize that examples of such other devices and/or processes and/or systems might include—as appropriate to context and application—all or part of devices and/or processes and/or systems of (a) an air conveyance (e.g., an airplane, rocket, helicopter, etc.), (b) a ground conveyance (e.g., a car, truck, locomotive, tank, armored personnel carrier, etc.), (c) a building (e.g., a home, warehouse, office, etc.), (d) an appliance (e.g., a refrigerator, a washing machine, a dryer, etc.), (e) a communications system (e.g., a networked system, a telephone system, a Voice over IP system, etc.), (f) a business entity (e.g., an Internet Service Provider (ISP) entity such as Comcast Cable, Qwest, Southwestern Bell, etc.), or (g) a wired/wireless services entity (e.g., Sprint, Cingular, Nextel, etc.), etc.

In certain cases, use of a system or method may occur in a territory even if components are located outside the territory. For example, in a distributed computing context, use of a distributed computing system may occur in a territory even though parts of the system may be located outside of the territory (e.g., relay, server, processor, signal-bearing medium, transmitting computer, receiving computer, etc. located outside the territory).

A sale of a system or method may likewise occur in a territory even if components of the system or method are located and/or used outside the territory.

Further, implementation of at least part of a system for performing a method in one territory does not preclude use of the system in another territory.

All of the above U.S. patents, U.S. patent application publications, U.S. patent applications, foreign patents, foreign patent applications and non-patent publications referred to in this specification and/or listed in any Application Data Sheet are incorporated herein by reference, to the extent not inconsistent herewith.

One skilled in the art will recognize that the herein described components (e.g., operations), devices, objects, and the discussion accompanying them are used as examples for the sake of conceptual clarity and that various configuration modifications are contemplated. Consequently, as used herein, the specific exemplars set forth and the accompanying discussion are intended to be representative of their more general classes. In general, use of any specific exemplar is intended to be representative of its class, and the non-inclusion of specific components (e.g., operations), devices, and objects should not be taken limiting.

With respect to the use of substantially any plural and/or singular terms herein, those having skill in the art can translate from the plural to the singular and/or from the singular to the plural as is appropriate to the context and/or application. The various singular/plural permutations are not expressly set forth herein for sake of clarity.

The herein described subject matter sometimes illustrates different components contained within, or connected with, different other components. It is to be understood that such depicted architectures are merely exemplary, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components, and/or wirelessly interactable, and/or wirelessly interacting components, and/or logically interacting, and/or logically interactable components.

In some instances, one or more components may be referred to herein as "configured to," "configurable to," "operable/operative to," "adapted/adaptable," "able to," "conformable/conformed to," etc. Those skilled in the art will recognize that such terms (e.g. "configured to") can generally encompass active-state components and/or inactive-state components and/or standby-state components, unless context requires otherwise.

Although specific dependencies have been identified in the claims, it is to be noted that all possible combinations of the features of the claims are envisaged in the present application, and therefore the claims are to be interpreted to include all possible multiple dependencies.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

With respect to the appended claims, those skilled in the art will appreciate that recited operations therein may generally be performed in any order. Also, although various operational flows are presented in a sequence(s), it should be understood that the various operations may be performed in other orders than those which are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

What is claimed is:

1. A method comprising:
   inducing a surface state at a first input location;
   defining a propagation path for the surface state by imposing a first spatially-varying magnetic field having a first non-zero magnitude $B_1$ at a first magnetic field location $r_1$ on the propagation path and a second non-zero magnitude $B_2$ at a second magnetic field location $r_2$ on the propagation path, the first spatially-varying magnetic field being configured to produce a spatially-varying permittivity, the propagation path extending from the first input location to a first output location spatially separated from the first input location; and
   varying the propagation path by changing the first spatially-varying magnetic field to a second magnetic field having a third non-zero magnitude $B_3$ at the first magnetic field location $r_1$ and a fourth non-zero magnitude $B_4$ at the second magnetic field location $r_2$, and wherein the ratio of $B_4/B_3$ is different from the ratio of $B_2/B_1$.

2. The method of claim 1 wherein the first spatially-varying magnetic field varies along one direction.

3. The method of claim 1 wherein the first spatially-varying magnetic field varies along two orthogonal directions.

4. The method of claim 1 wherein the first spatially-varying magnetic field varies along three orthogonal directions.

5. The method of claim 1 wherein the first spatially-varying magnetic field varies substantially monotonically.

6. The method of claim 1 wherein the first spatially-varying magnetic field varies non-monotonically.

7. The method of claim 1 wherein the first spatially-varying magnetic field is substantially quasi-static.

8. The method of claim 1 wherein varying the propagation path by changing the first spatially-varying magnetic field includes steering the surface state by changing the first spatially-varying magnetic field.

9. The method of claim 1 wherein the propagation path is substantially two-dimensional.

10. The method of claim 1 wherein the propagation path is substantially three-dimensional.

11. The method of claim 1 further comprising generating the first spatially-varying magnetic field.

12. The method of claim 1 wherein the spatially-varying permittivity varies in a first frequency range, and wherein the surface state has a second frequency range, and wherein the first frequency range overlaps at least in part with the second frequency range.

13. The method of claim 12 wherein the first frequency range includes optical frequencies.

14. The method of claim 12 wherein the second frequency range includes optical frequencies.

15. The method of claim 1 wherein the surface state includes a photonic crystal surface state.

16. The method of claim 1 wherein the surface state includes plasmon energy.

* * * * *